June 1, 1965  R. E. DIETZ ETAL  3,187,147
TANDEM ELECTRIC CIRCUIT BREAKER
Filed Oct. 14, 1960

INVENTORS.
Robert E. Dietz
Edward P. Dessert
David A. Pickett
Martin V. Zubaty

INVENTORS
Robert E. Dietz
Edward P. Dessert
David A. Pickett
Martin V. Zubaty

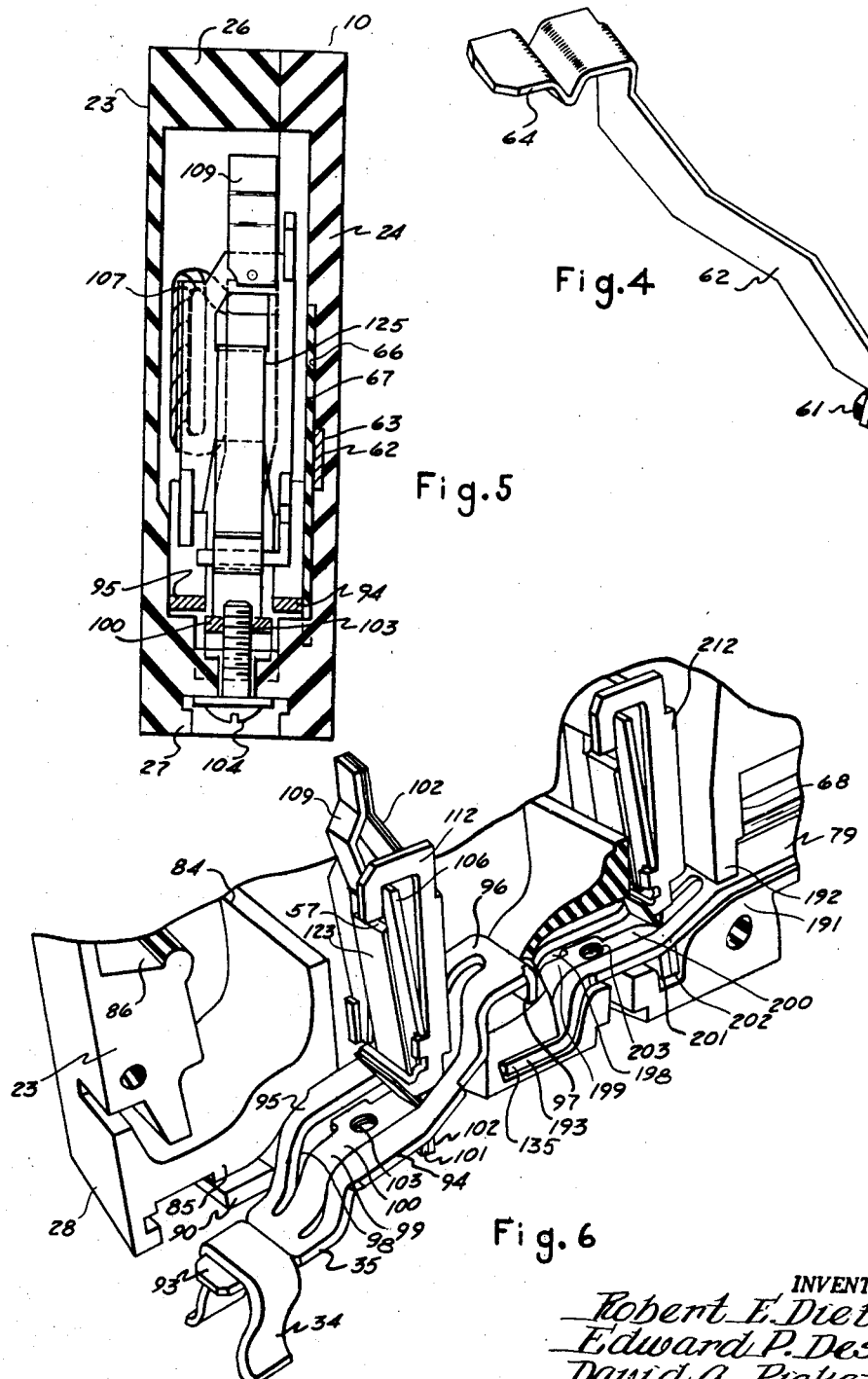

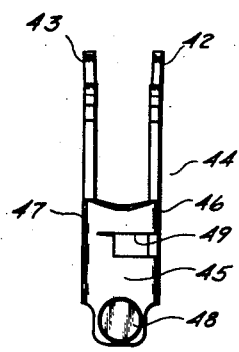
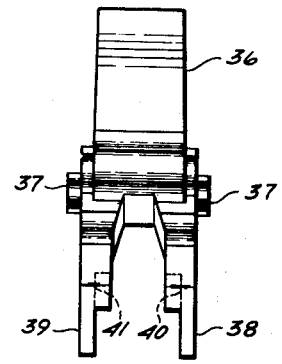
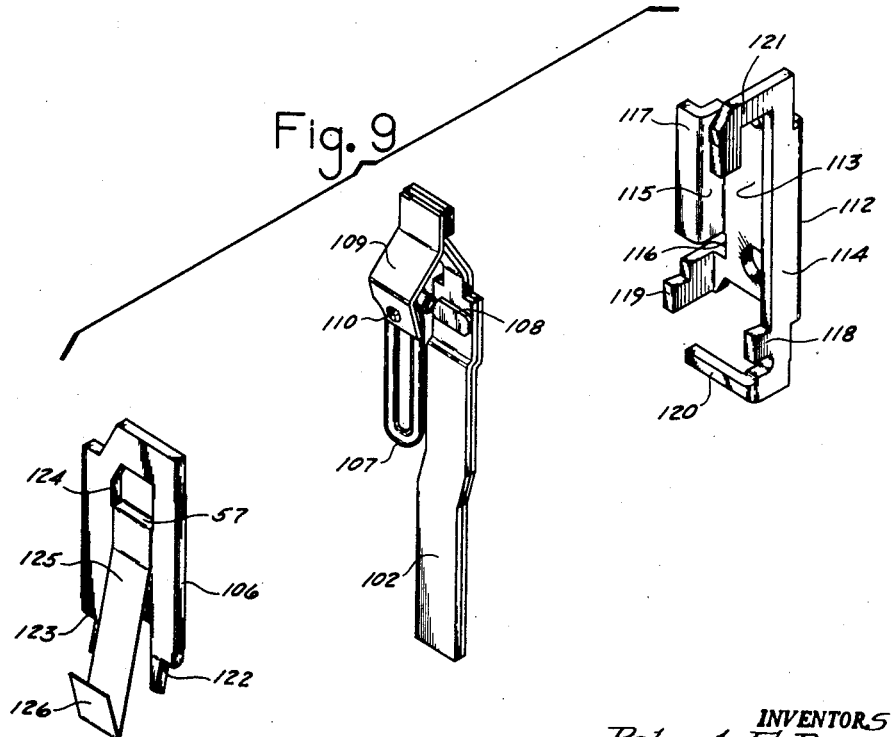

3,187,147
TANDEM ELECTRIC CIRCUIT BREAKER
Robert E. Dietz and Edward P. Dessert, Cedar Rapids, Iowa, David A. Pickett, Detroit, Mich., and Martin V. Zubaty, Philadelphia, Pa., assignors to Square D Company, Park Ridge, Ill., a corporation of Michigan
Filed Oct. 14, 1960, Ser. No. 62,740
3 Claims. (Cl. 200—144)

This invention relates generally to electric circuit breakers and particularly to molded case type automatic electric circuit breakers which are adapted for panelboard mounting.

Electrical panelboard installations which comprise an enclosure box and a mounting panel assembly therewithin upon which a plurality of molded case type automatic circuit breakers are removably mounted are widely used to control branch circuits in residential and commercial establishments. The mounting panel assembly usually comprises one or two rows of adjacent mounting spaces and each space can ordinarily accommodate one single pole circuit breaker. Ordinarily, if it is desired to provide protection for additional branch circuits and no vacant mounting spaces remain on the mounting panel assembly, it is necessary either to substitute a larger enclosure box and mounting panel assembly or to install an additional enclosure box and mounting panel assembly to accommodate additional circuit breakers. Since both expedients are costly, and in some cases are forbidden by spatial or aesthetic considerations, it is desirable to provide a circuit breaker which occupies a single space on an existing type of mounting panel assembly, which is interchangeable with an existing type of circuit breaker having only one mechanism, and which has more than one independently operable circuit controlling mechanism therewithin, each such circuit controlling mechanism being adapted to control an independent branch circuit. Because of the complexity of circuit breaker mechanisms, the design of a circuit breaker wherein two independently operable mechanisms occupy substantially the same amount of space formerly occupied by only one mechanism poses several difficult problems which must be overcome. It is necessary, for example, that the component parts of each mechanism be of sufficient size to assure adequate mechanical strength and proper current carrying capacity, that energizable components have proper electrical clearance from each other, that none of the components adversely affect each other either thermally or magnetically, and that the mechanisms be easy to operate.

Accordingly, it is an object of this invention to provide an improved circuit breaker which is adapted to afford protection for a plurality of independent branch circuits and is interchangeable in an existing type of panelboard with a prior art circuit breaker capable of protecting only one branch circuit.

Another object is to provide an improved circuit breaker wherein a pair of complex circuit breaker mechanisms are disposed in tandem relationship with respect to each other within a space formerly occupied by only one circuit breaker mechanism and wherein the components of each of the pair of mechanisms are arranged with respect to each other so as not to be affected adversely by those of the other, either thermally, electrically or magnetically.

Another object is to provide an improved circuit breaker wherein two independently operable circuit breaker mechanisms are disposed and supported within an insulating case in tandem relationship, said mechanisms being electrically connected to common line terminal means but to separate load or branch terminal means and said case being substantially similar in physical respects and dimensions to that for a single circuit breaker mechanism and interchangeable therewith on a mounting assembly.

Another object is to provide an improved circuit breaker having a single line terminal adapted for electrical connection to a panel assembly bus bar, two independent branch circuit terminals and two independently operable circuit breaker mechanisms, said mechanisms being electrically disposed between said branch circuit terminals, respectively, and said line terminal, and said mechanisms being physically arranged in tandem in a common insulating case so that all of the operative parts of each mechanism and all of the terminals are disposed in a common plane.

Another object is to provide improved circuit breaker mechanisms for use in a tandem circuit breaker of the aforesaid character and which, while being more compact than prior art mechanisms, are equal thereto or better in their electrical capacity, efficiency, reliability, ruggedness and safety.

Another object is to provide a circuit breaker having an improved arc-chamber and arc chute constructed so as to take advantage of the forces generated during arcing to effect efficient expulsion of the arc and its by-products into the arc-chute.

Another object is to provide a circuit breaker having an improved arc-chamber and arc-chute whereby arc by-products are expelled through the bottom wall of the case against a mounting panel assembly.

Another object is to provide a circuit breaker having an improved arc-chamber and arc-chute whereby arc by-products are expelled through an end wall of the circuit breaker case into the arc-chute of an adjacently mounted circuit breaker.

Another object is to provide a circuit breaker having a plurality of improved arc-chambers and arc-chutes therein whereby one arc-chute directs arc by-products against the circuit breaker mounting panel assembly and another arc-chute directs arc by-products into an arc-chute of an adjacently mounted circuit breaker.

Other objects and advantages of the invention will hereinafter appear.

The accompanying drawings illustrate a preferred embodiment of the invention, it being understood that the embodiment illustrated is susceptible of modification with respect to details thereof without departing from the scope of the appended claims.

FIG. 4 is a perspective view of an electrical conductor, also shown in FIGS. 1 and 2, which conducts current from a stationary contact in one circuit breaker mechanism to its associated load terminal;

FIG. 5 is a sectional view taken substantially along the line 5—5 of FIG. 2;

FIG. 6 is an enlarged perspective view of a portion of the circuit breaker illustrating the construction of the two tripping mechanisms and the conductor arrangement.

FIG. 7 is an elevational view of a movable contact carrier employed with the left hand circuit breaker mechanism and shown in FIGS. 2 and 3;

FIG. 8 is an elevational view taken along line 8—8 of FIG. 3 of an operating member employed with the left-hand circuit breaker mechanism; and FIG. 9 is an enlarged exploded view of the tripping mechanism or trip unit of the left-hand circuit breaker mechanism showing details thereof.

Figure 1:
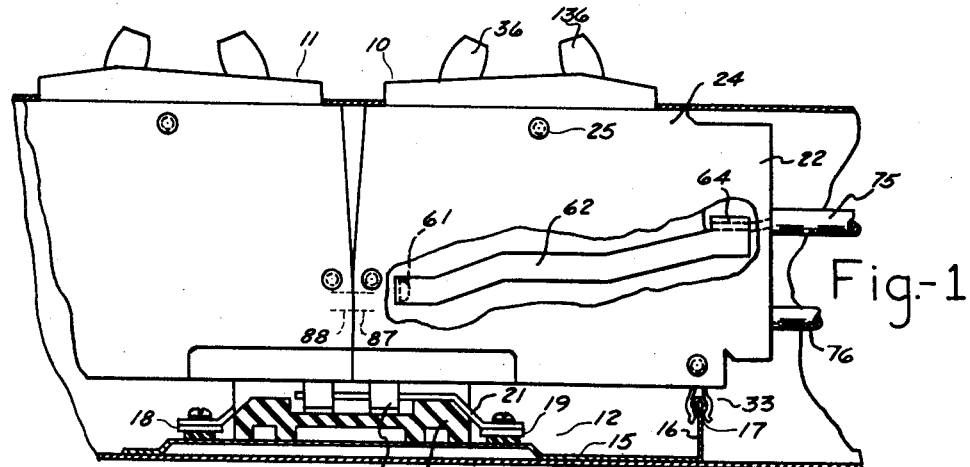
FIG. 1 is an elevational view of a pair of identical circuit breakers constructed in accordance with this invention showing them attached to a mounting panel assembly within an enclosure box.

FIG. 1 depicts a pair of circuit breakers 10 and 11 incorporating the invention mounted in end-to-end abutting relationship on a mounting panel assembly 12 which is rigidly secured to the rear or back wall 13 of an enclosure box 14. For purposes of illustration, portions of the enclosure box 14 have been deleted from FIG. 1, but it will be understood that these components are generally similar to the corresponding components shown in Patent No. 2,902,632, Stanback et al., issued to the same assignee as the present invention. Furthermore, it will be understood that the circuit breakers 10 and 11 could be disposed together with other circuit breakers (not shown) in parallel adjacent rows, as shown in said Patent No. 2,902,632.

The mounting panel assembly 12 comprises a pan member 15 having two flanged sides 16, only one of which is shown in FIG. 1, provided with rolled-over beaded portions, such as 17, which function as elements of the mounting means for the circuit breakers. The mounting panel assembly 12 further comprises a pair of longitudinally extending bus bars 18 and 19 which are rigidly mounted in spaced parallel relationship with respect to each other upon an insulating support 20 suitably secured to the pan 15. A plurality of terminal connectors, such as 21, are understood to be electrically and mechanically connected to the bus bars 18 and 19 in alternate arrangement lengthwise of the mounting panel assembly 12 and extend transversely from their associated bus bar toward the other to define longitudinally spaced mounting areas for the circuit breakers and each terminal connector 21 is adapted to provide for electrical connection of two circuit breakers, such as 10 and 11, to one of the bus bars.

Figure 2:
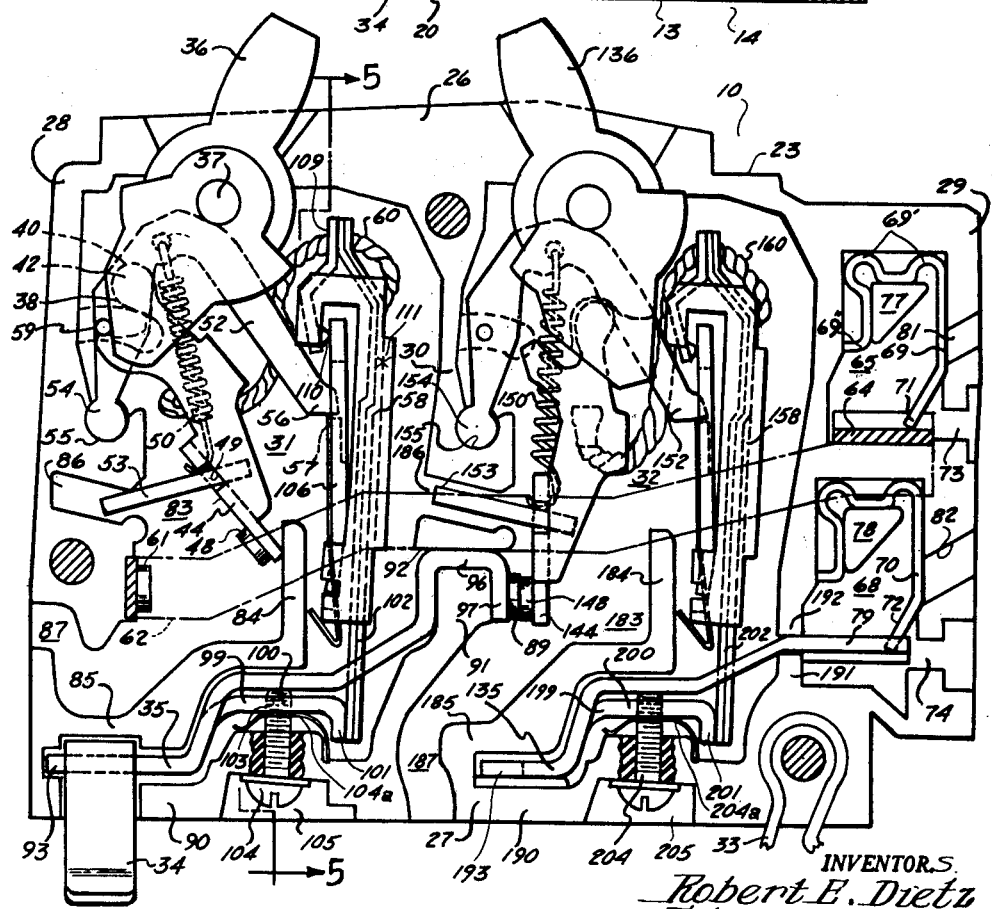
FIG. 2 is an enlarged elevational view of the interior of the right-hand circuit breaker shown in FIG. 1 and showing a left hand circuit breaker mechanism thereof in manually "off" position and showing a right-hand circuit breaker mechanism thereof in "on" position.
Figure 3:
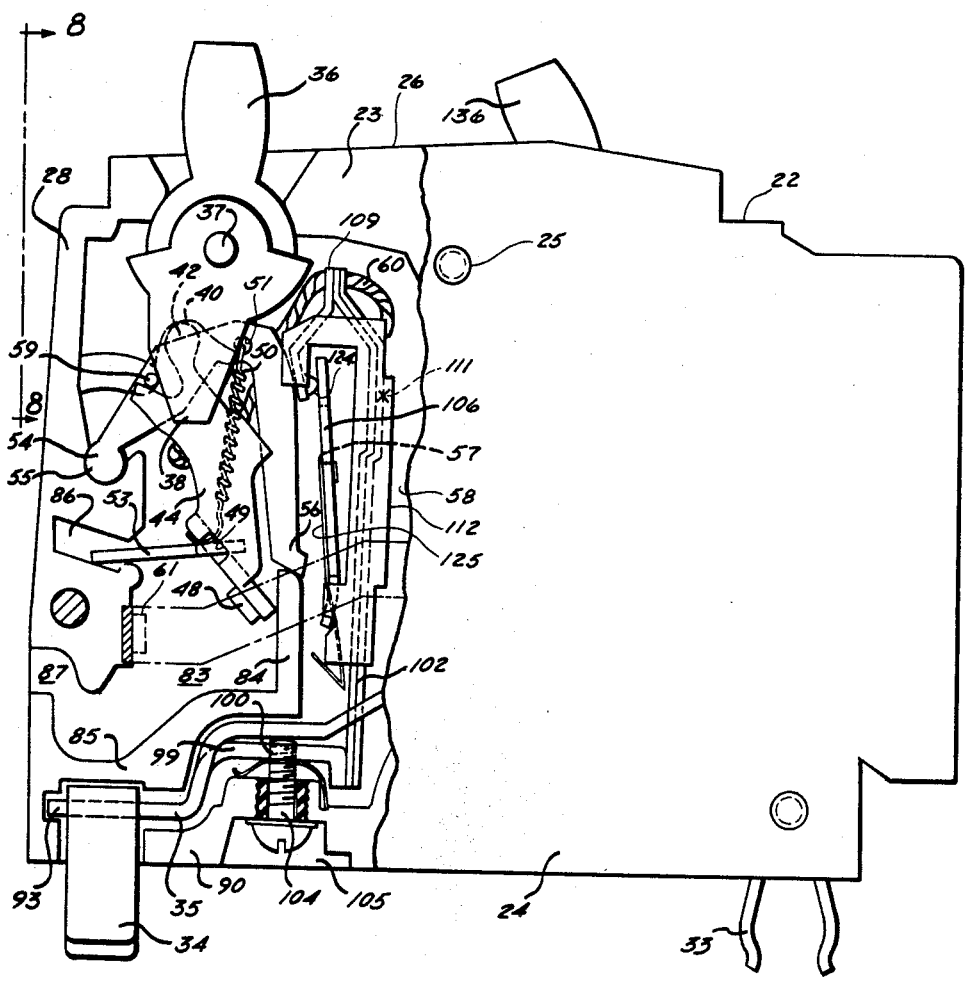
FIG. 3 is a view similar to that of FIG. 2, but showing the left-hand circuit breaker mechanism in "tripped" position.

The circuit breakers 10 and 11 may be assumed to be substantially identical and only the former will be described in detail hereinafter. As FIGS. 1, 2, 3, 5, and 6 show, the circuit breaker 10 has an insulating case 22 which comprises two mating portions, such as a main body portion 23 and a cover portion 24, each preferably fabricated by molding and each including a major planar wall portion and integrally formed peripheral projections which mate when the portions are secured together by the rivets 25 to define a top wall 26, a bottom wall 27, a left end wall 28, a right end wall 29 of substantial thickness, and an intermediate wall 30 which has a pair of apertures near its middle. The terms "top," "bottom," "back," and "front" are used merely to aid in interpreting the drawings and it is to be understood that the circuit breaker 10 may be mounted in any attitude without departing from the scope of the appended claims. The aforedescribed walls of the case 22 define two major cavities on the left-hand and right-hand sides (with respect to FIG. 2) of the intermediate wall 30 wherein the independently operable circuit breaker mechanisms 31 and 32, respectively, hereinafter described in detail, are disposed. The mechanisms 31 and 32 are disposed in tandem relationship with respect to each other along the bottom wall 27 and both lie in a plane which is parallel to and lies between the major planar wall portions of the case 22. As will hereinafter be explained, FIGS. 2 and 3 show the mechanism 31 in manually "off" and in "tripped" condition, respectively, and FIG. 2 shows the mechanism 32 in "on" condition.

As FIGS. 1, 2, and 3 show, the case 22 is provided at its lower right-hand corner with a generally U-shaped spring clip 33 which is similar in configuration and purpose to that described in Patent No. 2,902,632, hereinbefore referred to, and which is adapted to mechanically engage the beaded portion 17 of the pan 15 to support the circuit breaker 10 on the panel assembly 12.

As FIGS. 1, 2, 3 and 6 show, a U-shaped electrically conductive spring jaw terminal clip 34 which serves as the line terminal for both circuit breaker mechanisms 31 and 32, as will hereinafter be explained, projects through a hole in the bottom wall 27 of the case 22 near the left-hand side thereof and is adapted for electrical and mechanical connection to one of the terminal connectors 21 on the mounting panel assembly 12. The terminal clip 34, which is electrically and mechanically connected as by welding to the left-hand end of a rigid conductive member 35, hereinafter described, within the case 22, is similar to that shown and described in Patent No. 2,902,632 hereinbefore referred to.

The circuit breaker mechanism 31 comprises a manually movable operating member 36, best seen in FIGS. 2, 3, and 8, having a handle portion which projects through a hole in the top wall 26 of the case 22 and having a trunnion 37 for pivotal cooperation with suitable bearing recesses (not shown) which may be assumed to be provided on the inside of the body portion 23 and the cover portion 24 of the case 22. That portion of the operating member 36 which extends into the cavity in the case 22 provided for the mechanism 31 is provided with a pair of legs or bifurcations 38 and 39. Notches or recesses 40 and 41 are provided inwardly of the legs 38 and 39, respectively, of the operating member 36 and are adapted for pivotal engagement with spaced rounded end portions 42 and 43 of a movable contact carrier 44.

The movable contact carrier 44, best seen in FIG. 7, is fabricated of rigid, electrically conductive material and comprises a flat frontal portion 45 and integrally formed side portions 46 and 47 which terminate in the rounded end portions 42 and 43, respectively. A movable contact 48 is electrically and mechanically connected to the lower end of the flat frontal portion 45 of the movable contact carrier 44. The movable contact carrier 44 is provided with a notch 49 which affords a means for the attachment of the lower end of a helical tension spring 50 having its upper end secured through a hole 51 in the bight of an inverted U-shaped cradle 52. The notch 49 also accommodates a portion of a movable arc barrier 53, hereinafter described.

The cradle 52 has a rounded end portion 54 which is pivotally supported in a socket 55 molded in the inside of the left wall 28 of the case 22. The other end 56 of the cradle 52 is adapted to engage with a latch surface 57 of a current responsive tripping mechanism 58, hereinafter described. The cradle 52 is provided with a reset pin 59 (FIGS. 2 and 3) which is located for engagement with an edge of the leg 38 of the operating member 36, as will appear.

One end of a flexible conductor 60 is electrically connected, as by welding, to the movable contact carrier 44, and the other end of the conductor 60 is connected as will hereinafter be described. The movable contact 48 on the lower end of the contact carrier 44 is adapted to cooperate with a stationary contact 61 which is positioned adjacent the inside of the left wall 28 of the case 22.

The stationary contact 61 is electrically and mechanically connected to an inturned end portion of a flat, rigid, elongated electrical conductor 62, best seen in FIGS. 1 and 4. The intermediate portion of the conductor 62, which is disposed in a recess 63 (see FIG. 5) formed in the inside surface of the cover 24 of the case 22 and is partially supported thereby, lies in a plane which is between and parallel to the major planar wall portions of the case 22, and lies alongside of the movable contact carrier and current responsive tripping mechanism of each of the circuit breaker mechanisms 31 and 32. A grooved terminal end portion 64 of the conductor 62 is disposed in and lies against the floor of an uppermost load terminal recess 65, hereinafter described, which is formed in the right end wall 29 of the case 22, as FIGS. 1 and 2 make clear.

As FIG. 5 shows, an insulating member 66 disposed in a recess 67 formed in the inside surface of the cover 24 of the case 22 overlies the conductor 62 to insulate it from the electrically energizable portions of the circuit breaker mechanisms 31 and 32.

As FIG. 2 shows, the right end wall 29 of the case 22 is provided with a cavity or recess 68 in addition to the recess 65, the recess 65 being situated above the recess 68 to conserve space. The recesses 65 and 68 are adapted to accommodate U-shaped spring members 69 and 70, respectively, which have respective movable resilient offset end portions 71 and 72 situated so as to overlie access openings 73 and 74, respectively, for receiving the bared ends of respective branch circuit conductors such as 75 and 76 shown in FIG. 1. The spring members 69 and 70 are secured by entrapment between the walls of their respective cavities and molded projections 77 and 78, respectively, therewithin. When the conductor 75 is inserted through the opening 73, it becomes mechanically wedged between the resilient end portion 71 of the spring 69 and the grooved terminal portion 64 of the conductor 62, hereinbefore described, and is thus electrically connected to the latter. When the conductor 76 is inserted through the opening 74, it becomes mechanically wedged between the resilient end portion 72 of the spring 70 and a grooved terminal portion 79 of a conductor 135, hereinafter described. Attempted removal of the branch circuit conductor wires by pulling thereon causes the end of the respective spring members to bite or dig into the wires, thus holding them even more securely. The wall 29 is further provided with tool insertion openings 81 and 82 opening into the recesses 65 and 68 to permit entry of a tool (not shown) for moving the resilient end portion of the spring members 69 and 70 selectively out of engagement with their respective branch circuit conductors to free the latter for removal.

To overcome problems involved in the molding of narrow slots, the upper and inner walls of the projection 77 are spaced relatively large distances from the upper and inner walls of the cavity 65, respectively. These distances are greater than the thickness of the spring 69 and the spring 69 is provided with a pair of convolutions 69′ and a turned out end portion 69″ thereby to hold the spring 69 firmly in position and to prevent its rotation around the projection 77. The projection 78 of the cavity 68 and the spring member 70 are constructed in like manner.

The movable contact 48 and the stationary contact 61 are disposed within an arc chamber 83 which, in accordance with this invention, is bounded in part by the adjacent major planar wall portions of the portions 23 and 24 of the case 22, the portion of the left wall 28 adjacent the stationary contact 61, and a stop projection 84 which is integrally formed with a projection 85, extends upwardly away from the bottom wall 37 at a distance from the stationary contact 61, and lies between the stationary contact 61 and the trip mechanism 58. The top of the arc chamber 83 is bounded by the movable arc barrier 53, fabricated from a sheet of insulating material, which has one end extending through the aperture 49 in the movable contact carrier 44 and has its other end slidably received in a recess 86 provided in the left wall 28 of the case 22. FIGS. 2 and 3 make clear that, as the contact carrier 44 moves away from the stationary contact 61, the flat portion 45 of the movable contact carrier 44 defines another wall of the arc chamber 83. Thus confined, any arc formed between the contacts 48 and 61 is prevented from adversely affecting the spring 50, the cradle 52, the operator 36 and the trip mechanism 58. The stop projection 84 also serves to limit travel of the movable contact 44 when the circuit breaker mechanism 31 is opened manually (FIG. 2) or tripped (FIG. 3).

Further in accordance with this invention, the surfaces of the walls, projections and members which define the arc chamber 83 are angularly related with respect to each other and with respect to the path of the arc which forms as the contacts 48 and 61 separate so that the arc, its gases and other byproducts are blown in a direction away from the components of the mechanism 31 and toward an arc chute 87, shown in FIGS. 2, 3, and 6, which merges with the arc chamber 83 at the lower left-hand (with respect to FIG. 2) corner thereof. The arc chute 87 extends through the left wall 28 of the case 22 so that, as FIG. 1 shows, when the circuit breakers 10 and 11 are engaged end-to-end on the mounting panel assembly 12, as is the usual arrangement, the mouth of the arc chute 87 aligns with a similarly disposed arc chute 88 in circuit breaker 11. Thus, arc by-products are safely discharged through the arc chute 87 of the circuit breaker 10 into the arc chute 88 of the circuit breaker 11 rather than directly into the enclosure box 14.

As FIGS. 2, 3, 5, and 6, show the rigid conductive member 35 is rigidly secured within the case 22, as will hereinafter be explained, and affords mechanical support for the tripping mechanism 58 of the circuit breaker mechanism 31 and also affords mechanical support for a stationary contact 89 which is part of the circuit breaker mechanism 32. In addition, the conductive member 35 serves as the electrical current path between the electrically conductive spring jaw terminal clip 34, hereinbefore described, and the tripping mechanism 58 and between the clip 34 and the stationary contact 89.

The conductive member 35 is secured in the case 22 by entrapment at its left-hand end between the projection 85 and a portion 90 of the bottom wall 27 and by entrapment at its right-hand end between a lower portion 91 of the intermediate wall 30 and a spaced portion 92 thereof. The conductive member 35 comprises a planar lower end portion 93 to which the terminal clip 34 is connected, an offset intermediate portion comprising the spaced-apart segments 94 and 95, best seen in FIG. 6, and a planar upper end portion 96 which is provided with a downwardly depending portion 97 to which the stationary contact 89 for the circuit breaker mechanism 32 is electrically and mechanically connected, as by welding.

The intermediate portion of the conductive member 35 is provided with an elongated aperture 98, bounded by the segments 94 and 95, through which a tongue 99 projects. The tongue 99 is integrally formed at one end with the end portion 93 of the conductive member 35 and comprises an intermediate adjustment portion 100 which terminates in a downwardly depending flange 101 to which the lower end of a bimetallic element 102 of the current responsive trip mechanism 58, hereinafter described, is electrically and mechanically connected, as by welding. The intermediate adjustment portion 100 of the tongue 99 is provided with a tapped hole 103 which accommodates a calibration screw 104 extending through a hole in the bottom wall 27 in the case 22. The head of the calibration screw 104 is disposed in a recess 105 provided in the exterior side of the bottom wall 27. Calibration is effected by rotation of the screw 104 to effect movement of the adjustment portion 100 of the tongue 99 toward or away from the bottom wall 27, which motion, in turn, effects movement of the trip mechanism 58 selectively away from or toward the cradle 52 of the circuit breaker mechanism 31. In this manner the overlap between the end 56 of the cradle 52 and the latch surface 57 on an armature 106 of the tripping mechanism 58 is varied. The calibration screw 104 also aids in mechanically supporting the conductor member 35 in a fixed position within the case 22. In practice, the head of the calibration screw 104 is sealed with material such as wax after the initial factory adjustment is made. It is advantageous to locate the calibration screw 104 on the bottom wall 27 of the case 22 so that it will be concealed to discourage any attempts to tamper therewith when the circuit breaker is installed on the panel assembly; the screw 104 being accessible only if the circuit breaker is removed from the panel assembly.

Preferably, as FIGS. 2 and 3 show, a small leaf spring or calibration spring 104a, which has a hole (not shown) therein to accommodate the shank of the screw 104, is disposed between the bottom wall 27 of the case and the underside of the tongue 99 to bias the latter upward against the force of the screw 104. This has the effect of stabilizing the calibration of the circuit breaker by rigidifying the disposition of the member 35 within the case.

The particular construction of the rigid conductor member 35, described hereinbefore, has certain features which are of special advantage in a tandem circuit breaker of the type disclosed herein. The provision of the aperture 98 permits a relatively longer and more responsive bimetallic element, such as the element 102 hereinafter described, to be employed in the tripping mechanism. Furthermore, the provision of the tongue 99 and the aperture 98 makes it less likely that heat from the bimetallic element 102 will be directly transferred to those portions of the conductive member 35 which extend into the cavity which receives the circuit breaker mechanism 32 to adversely affect the performance of the latter mechanism.

The tripping mechanism 58, which is associated with the circuit breaker mechanism 31, is best seen in FIGS. 2, 6, and 9. The tripping mechanism 58, which is a compact and independent unit, is entirely supported by the conductive member 35 and comprises the elongated bimetallic thermally responsive element 102 which has its lower end electrically and mechanically connected, as by welding, to the depending flange 101 of the tongue 99 of the conductive member 35. One end of a looped, insulated conductor 107, whose other end is adapted to be electrically connected to the flexible conductor 60, is electrically connected as by welding to the bimetallic member 102 as at 108 in FIG. 9. A Z-shaped bimetallic member 109 for ambient temperature compensation is mechanically attached to the upper end of the thermally responsive bimetallic member 102 and is provided with an embossed projection 110 which bears against the upper end of an armature 106 hereinafter described. The thermally responsive member 102 is mechanically attached, as at 111 (see FIG. 2), to a yoke or core member 112 whose configuration is best shown in FIG. 9. As FIG. 9 shows, the core member 112, which is fabricated of magnetic material, comprises a flat portion 113 and two side portions 114 and 115, the latter of which is provided with a cutout 116 and with a flange 117 which are adapted to accommodate the looped conductor 107. The lower portions of the sides 114 and 115 of the yoke 112 are provided with the projection portions 118 and 119, respectively, which afford support for the armature 106, hereinafter described, and the lower end of the side 114 is further provided with a finger 120 which is bent so as to lie in a plane which is substantially parallel with the flat portion 113 of the yoke. The upper end of the side 114 of the yoke 112 is provided with a hook-like portion 121 which is adapted to limit the travel of the armature 106 by engaging the upper end thereof. The armature 106 is fabricated of magnetic material and is provided with the notches 122 and 123 which adapt it to pivot on the projecting portions 118 and 119, respectively, of the yoke 112, and is further provided with a cutout or opening 124. An elongated resilient member or spring 125 has a bent over upper end portion or latch portion 57 which engages the lower edge of the cutout 124 in the armature 106 and also serves as the latch surface for the end 56 of the cradle 52. The lower end portion 126 of the spring 125 is bent back upon itself and the portion of the spring adjacent thereto is disposed behind the finger 120 of the yoke 112, thus tending to bias the armature 106 away from the yoke 112. The spring 125 also serves to hold the armature 106 on the yoke 112. FIG. 2 shows the tripping mechanism 58 in latching engagement with the end 56 of the cradle 52 of the mechanism 31 and FIG. 3 shows the tripped position wherein the trip mechanism 58 is disengaged from the cradle 52.

As will be understood, when the circuit breaker mechanism 31 is in "closed" condition (not illustrated) the current path is from terminal clip 34, through the adjustment portion 100 of the conductor 35, through the bimetallic member (102) of the tripping mechanism 58, through the looped conductor 107, through the flexible conductor 60, through the contact carrier 44 and the movable contact 48, through the stationary contact 61, and through the conductor 62 to the end portion 64 thereof.

The right hand circuit breaker mechanism 32 is substantially similar in structure and operation to the circuit breaker mechanism 31. The circuit breaker mechanism 32 comprises an operator 136, a cradle 152, a movable contact carrier 144 having a movable contact 148, a spring 150 and a current responsive tripping mechanism 158, all of which components are identical in form and function to their counterparts in the circuit breaker mechanism 31, hereinbefore described. It is to be noted that the stationary contact 89 of the mechanism 32 is electrically and mechanically attached to the depending portion 97 of the conductive member 35, hereinbefore described. The cradle 152 has one end 154 pivotally supported in a socket 155 which is formed in the intermediate wall 30. The intermediate wall 30 is also provided with a slot 186 for accommodating a movable arc barrier 153 which cooperates with the movable contact carrier 144. A stop projection 184, similar in form and function to the stop projection 84, is provided for limiting the travel of the movable contact carrier 144 and the cradle 152. The tripping mechanism 158 of the mechanism 32 is supported by a conductive member 135, seen in FIGS. 2 and 6, fabricated from an elongated member which is initially bent to form a planar lower end portion 193, a planar intermediate portion parallel to but offset with respect to the portion 193, and the upper end portion 79. The conductive member 135 is provided with an elongated aperture or window 198 into which a tongue or center arm 199 projects; such tongue or arm having one end integrally formed with the end portion 193 of the conductive member 135. The arm 199 has an intermediate adjustment portion 200 which lies in a plane substantially parallel to the plane in which the end portion 193 lies. The intermediate adjustment portion 200, which is provided with a threaded hole 203 to accommodate the threaded shank of a calibration screw 204, terminates at its free end in a downwardly depending flange 201 to which the lower end of a bimetallic element 202 of the tripping mechanism 158 is mechanically and electrically connected.

The conductive member 135 is substantially similar to the member 35, hereinbefore described. The end portion 79 of the member 135, however, is grooved and resembles the portion 64 of the conductive member 62 shown in FIG. 4 and is adapted to lie against the floor of the lower cavity 68.

The conductive member 135 is maintained stationary relative to the case 22 by entrapment at its left hand end in a recess defined by the molded projection 185, a portion 190 of the bottom wall 27, and by entrapment at its right hand end in a slot between projections 191 and 192 of the wall 29.

Calibration of the right hand circuit breaker mechanism 32 is effected by rotating the calibration screw 204 in the same manner as the screw 104 hereinbefore described. The screw 204 extends through an opening provided in the bottom wall 27 in the case 22 and the head of the screw 204 is disposed in a recess 205 provided on the exterior of bottom wall 27. The screw 204 also aids in mechanically supporting the conductive member 135 within the case 22. A calibration spring 204a, similar in form and function to the spring 104a, hereinbefore described, is provided. The screw 204, like the screw 104, is inaccessible when the circuit breaker is mounted on the panel assembly 12. It is advantageous that the calibration screws 104 and 204 lie in the same plane because in manufacture of the circuit breaker, automatic calibrating equipment can then be arranged to adjust both circuit breakers simultaneously from the same direction at one stage of the manufacturing process.

In accordance with this invention, the movable contact 148 and the stationary contact 89 are disposed within an arc chamber 183 which is similar in construction to the chamber 83 heretobefore described and which communicates with an arc chute 187 which extends through the bottom wall 27 of the case 22 between the adjusting screws 104 and 204. The arc chute 187 is arranged so that, during arcing, the arc and its by-products are safely directed against the panel assembly 12, which has the effect of snuffing the arc and confining the by-products to a limited area within the enclosure box 14.

As will be understood from FIG. 2, when the circuit breaker mechanism 32 is in "closed" condition, the current path is from terminal clip 34 through the entire length of the conductor 35 and the stationary contact 89 carried thereby, through the movable contact 148 and the contact carrier 144 which supports it, through the flexible conductor 160, through a looped conductor (not shown), similar to the looped conductor 107, through the bimetallic member 202 of the trip mechanism 158, through the adjustment portion 200 of the conductor 135, and through the conductor 135 to the end portion 79 thereof.

It is to be noted that when both circuit breaker mechanisms 31 and 32 are energized, the current flow through each of the bimetallic members 102 and 202 of the respective trip mechanisms is in a direction opposite to that of the other.

Each of the independently operable circuit breaker mechanisms 31 and 32 is mounted in a case 22 which is substantially similar to a case of known design which encloses a single circuit breaker mechanism therewithin.

The tandem relationship of the mechanisms 31 and 32 has many advantages over the side-by-side arrangement found in the prior art in that the tripping mechanisms 58 and 158 are more widely separated to reduce the magnetic and thermal effect of one upon the other. It is thus apparent that each circuit breaker mechanism can be adjusted to operate at its own predetermined maximum load current and completely independently of the other circuit breaker mechanism. Another advantage of a tandem arrangement is that it is unnecessary to reduce the widthwise dimension of the components within the case 22, thus those components retain their mechanical strength and current carrying capacity. A further advantage is that the operating handles of one will not inadvertently result in operation of the other as is often the case if the handles are disposed side-by-side.

The circuit breaker 10 operates in the following manner: It may be assumed that the circuit breaker 10 is mounted on the panel assembly 12 in the enclosure box 14, as shown in FIG. 1, and that the branch circuit conductors 75 and 76 are connected thereto as shown in FIG. 1 and described hereinbefore. Referring to FIG. 2, assume that the circuit breaker mechanism 31 initially is in the manually "open" or "off" condition, as shown. In this condition, the exterior handle portion of operator 36 is disposed to the right. The end 56 of the cradle 52 is in latched engagement with the latch surface 57 of the trip mechanism 58. The spring 50 is positioned by the cradle 52 so as to draw the movable contact carrier 44 against the molded stop 84 thereby effecting separation of the movable contact 48 and the stationary contact 61.

To effect closure of the contacts 48 and 61 to thus establish an electrical circuit between the terminal 34 and the conductor 75, it is first necessary to rotate the operator 36 in the counterclockwise direction about its axis. This causes the end portions 42 and 43 of the movable contact carrier 44 to be moved toward the right and across the centerline of the spring 50 and the latter contracts, thereby causing the movable contact carrier 44 to pivot on the operator 36 in the clockwise direction so that the movable contact 48 engages the stationary contact 61 with a snap action. As will be understood, the constituent elements of the mechanisms 31 then assume the relative positions in which their counterparts in the mechanism 32 are shown in FIG. 2.

The circuit breaker mechanism trips in the following manner: When a fault condition occurs in the branch circuit which causes prolonged excessive current flow and consequent temperature rise in the temperature responsive bimetal 102 of the tripping mechanism 58, the entire tripping mechanism 58 moves clockwise (FIG. 2) sufficiently far to cause the end 56 of the cradle 52 to slip off of the latch surface 57 of the tripping mechanism. When a short circuit condition in the branch circuit occurs which causes a magnetic field around the yoke 112 of the tripping mechanism 58 of sufficient magnitude to attract the armature 106 toward the yoke, the end 56 of the cradle 52 slips off of the latch surface 57 of the tripping mechanism. In either event, the tension of the spring 50 causes the cradle 52 to pivot clockwise about its end 54 until its end 56 engages the molded stop 84. As the center line of the spring 50 moves past the pivoted ends 42 and 43 of the movable contact carrier 44, the tendency of the spring 50 to contract causes the movable contact carrier 44 to pivot in the counterclockwise direction, thereby effecting separation of the contacts 48 and 61 with a snap action. The travel of the movable contact carrier 44 is limited by the molded stop 84. The constituent elements of the mechanism 31 thus assume the position shown in FIG. 3. It is noted that the handle of the manual operator 36 moves from the extreme leftward position to a central position. The central or upright position of the handle of the manual operator 36, shown in FIG. 3, serves to indicate visually that the circuit breaker mechanism has tripped. The mechanism is "trip free," that is to say, the mechanism will trip upon occurrence of a fault condition even if the handle of the operator 36 is restrained manually or by other means in the extreme counterclockwise position.

The circuit breaker mechanism 31 is reset after tripping by moving the operating member 36 from its central position, shown in FIG. 3, in a clockwise direction so that the leg 42 of the operating member 36 bears against the reset pin 59 thereby causing the cradle 52 to pivot in a counterclockwise direction about its end 54, thus raising the latch end 56 of the cradle upwardly until it again engages with the latch surface 57 of the trip mechanism 58. The parts of the mechanism 31 then assume the relative position shown in FIG. 2 and are in position to be operated as hereinbefore described.

It is to be understood that the mechanism 32 of the circuit breaker 10 operates in a similar manner.

What is claimed is:
1. An electrical panelboard comprising:
 (a) a mounting panel assembly, and
 (b) a pair of substantially identical molded-case electric circuit breakers mounted thereon in abutting end-to-end relationship and reversely positioned with respect to each other so that a particular end wall of the case of one circuit breaker abuts a corresponding end wall of the case of the other circuit breaker,
 (c) each circuit breaker having a first circuit breaker mechanism and a second circuit breaker mechanism disposed in the case thereof in tandem relationship from its said end wall,
 (d) each circuit breaker mechanism including a pair of separable contacts between which an arc tends to form upon separation thereof when energized, and
 (e) each circuit breaker having a first arc chute and a second arc chute respectively associated with the separable contacts of the first and second circuit breaker mechanisms therein, said first arc chutes venting respectively through said end walls whereby arc by-products can be discharged from said first arc chute of one circuit breaker into the first arc chute of the other through said abutting end walls, and said second arc chutes venting respectively through walls of said casings facing said mounting panel assembly.

2. An electrical panelboard comprising:
(a) a mounting panel assembly, and
(b) a pair of substantially identical molded-case electric circuit breakers mounted thereon in abutting end-to-end relationship and reversely positioned with respect to each other so that a particular end wall of the case of one circuit breaker abuts a corresponding end wall of the case of the other circuit breaker,
(c) each circuit breaker having a circuit breaker mechanism in the case thereof including a pair of separable contacts between which an arc tends to form upon separation thereof when energized, and
(d) each circuit breaker having an arc chute associated with the separable contacts therein and venting through the said end wall thereof, whereby arc by-products can be discharged from the arc chute of one circuit breaker into the arc chute of the other through said abutting end walls.

3. A molded case electric circuit breaker comprising:
(a) an insulating case including a bottom wall portion and a pair of opposite end wall portions,
(b) a first circuit breaker mechanism and a second circuit breaker mechanism disposed in said case and extending in tandem relationship between said end wall portions, each of said circuit breaker mechanisms including a pair of separable contacts between which an arc tends to form upon separation when energized,
(c) a first load terminal operatively connected to said first circuit breaker mechanism and a second load terminal operatively connected to said second circuit breaker mechanism, both of said load terminals being located adjacent one of said end wall portions,
(d) a first arc chute associated with the separable contacts of said first circuit breaker mechanism and venting through the other of said end wall portions, and
(e) a second arc chute associated with the separable contacts of said second circuit breaker mechanism and venting through said bottom wall portion.

References Cited by the Examiner

UNITED STATES PATENTS

| | | | |
|---|---|---|---|
| 2,647,191 | 7/53 | Humpage | 200—144 |
| 2,810,048 | 10/57 | Christensen | 200—116 |
| 2,902,560 | 9/59 | Stanback et al. | 200—88 |
| 2,922,004 | 1/60 | Miller et al. | 200—88 |
| 3,040,144 | 6/62 | Norden | 200—116 X |

FOREIGN PATENTS

| | | |
|---|---|---|
| 516,354 | 9/55 | Canada. |
| 577,263 | 6/59 | Canada. |
| 793,885 | 4/58 | Great Britain. |

JOHN F. BURNS, *Primary Examiner.*

SAMUEL BERNSTEIN, *Examiner.*